Inventor
Ernst FUHRMANN
By Toulmin & Toulmin
Attys

Dec. 14, 1965 E. FUHRMANN 3,223,223
APPARATUS FOR AUTOMATICALLY INSPECTING SPLIT RINGS
Filed Oct. 19, 1964 4 Sheets-Sheet 3

Inventor
Ernst FUHRMANN
By Toulmin & Toulmin
Attys

Dec. 14, 1965  E. FUHRMANN  3,223,223
APPARATUS FOR AUTOMATICALLY INSPECTING SPLIT RINGS
Filed Oct. 19, 1964  4 Sheets-Sheet 4

Inventor
ERNST FUHRMANN

By Toulmin & Toulmin
Attys

United States Patent Office 3,223,223
Patented Dec. 14, 1965

3,223,223
APPARATUS FOR AUTOMATICALLY
INSPECTING SPLIT RINGS
Ernst Fuhrmann, Burscheid, Germany, assignor to
Goetzewerke Friedrich Goetze A.-G., Burscheid, Germany
Filed Oct. 19, 1964, Ser. No. 404,898
10 Claims. (Cl. 198—19)

This invention relates to an apparatus for automatically inspecting split rings such as piston rings and is by way of being a continuation-in-part of my co-pending application Serial No. 238,921 filed November 20, 1962 now abanoned and entitled: Apparatus for Automatically Inspecting Split Rings.

Automatically inspection devices for split rings such as piston rings are known and in general comprise an arrangement whereby the rings are fed from a magazine to one or more inspection stations. Push rods and the like are employed in such devices for advancing the piston rings from the magazine to the first station and from the first station on to succeeding stations. During the inspection, the rings are separated between those that pass inspection and those that do not. Such devices heretofore have been limited in the number of inspection stations that could be incorporated in the device because of the nature, principally of the conveying mechanism. Less than complete inspection of the rings for all the pertinent qualities has heretofore been the case in connection with prior art machines, thus leading to multiple handling of the rings with consequent consumption of time and the possibility of damaging the rings or getting rings rejected in one station mixed up with rings passing through other stations. Because of the difficulty with heretofore known devices of obtaining complete inspection of all rings, it has become the practice to make only simple inspections so that with heretofore known devices, it was easy for defective rings to be passed through.

The primary object of the present invention is the provision of an apparatus for automatically inspecting split rings such as piston rings which overcomes the drawbacks referred to above.

A particularly important object of the present invention is the provision of a novel conveying mechanism for moving the rings from a supply magazine thereof through a plurality of checking stations in succession so that in one and the same apparatus a complete inspection of the rings can be made and at such a speed that 100% inspection of all rings can be made, and through all of the necessary inspection stations in a single operation.

A further object of the present invention is the provision of a piston ring inspection station that can be controlled by a single operator and which will, in one passage of the ring through the device the following inspection operations on the ring, namely; (a) gap measurement; (b) measurement of the axial thickness; (c) measurement of tangential force; and (d) checking the rings for the positional placement thereof; and any other necessary inspections or markings required for the rings.

Each inspection station is preferably associated with a sorting device, usually following the station, in which the rings falling outside the tolerance limits are discharged. Air jet means are suitable for this purpose.

The invention in general comprises an arrangement in which a reciprocating slide is provided which picks up a ring from the magazine on each retraction stroke and delivers it to an intermediate station on each advancing stroke. At the same time of each retracting stroke, the reciprocating slide picks up a ring from each inspection station and advances it to an intermediate station ahead of the next inspection station where the ring can be discharged if it falls outside the tolerance limits. At the extreme end of the machine opposite the supply magazine, the rings may be discharged to any suitable receiver arrangement which will receive only rings which have passed all inspection tests.

For the purpose of picking up the rings and advancing them, after they have been removed from the magazine, the slide is provided with upwardly movable elements which will move upwardly when the slide is retracted so as to be in abutting relation with the adjacent ring so that the ring will move forward with the slide on the next advancing movement of the slide, while the said upwardly movable elements are retracted, and when the slide moves in its retracting direction so that the rings will remain in their respective advanced positions.

The slide is positioned in a table on which the rings rest at their edge portions and which table is adapted for receiving the inspection stations with their respective measuring devices. In this manner it is possible to add or eliminate inspection stations, and it is possible for the inspection stations to be made idle if so desired without interfering with the rhythmic operation of the apparatus according to the present invention.

In order to determine the tangential force of a ring, the diametral force is measured, a leaf spring being inserted between the ring and a measuring dial instrument so that the distance traversed by the spring is recorded by the dial. A helical spring or the like can also be used for such measurement of force and distance.

The gap play can be readily measured with the aid of two relatively movable half shells. Preferably the departure from the mean tolerance is measured, a dial instrument determining this departure by sensing the displacement of the movably mounted shell. The axial height of the ring may advantageously be determined between two superimposed measuring points with one of which is associated a dial instrument. The ring is preferably measured at two places, for example, at 90° from the gap. The stationary measuring point may consist of a wear-resistant material and project slightly from the associated surface of the device. This ensures that any particles or dirt on the surface of the measuring device do not adversely affect the measuring operation.

At the end of the device, before the rings pass through a stamping or marking device, a test is made as to whether they are correctly positioned for marking. Rings which in cross section have running surfaces of conical form, may be sorted out, for example, with the aid of two measuring stops one positioned above the other, one of the two stops being connected in an electrical circuit. When the ring touches this stop it completes the electrical circuit and the corresponding ring is removed at the next following sorting station.

A jet of compressed air is advantageously used for sorting out the rings. This rejecting operation is also suitable for automatic inspecting and stamping apparatus, if a test piece is to be sorted out after the measurements have been made and before being conveyed further, due to exceeding the tolerance limits or the like. Further, the operation can also be effectively used when it is desired to sort out test pieces separately upon exceeding tolerance limits in positive or negative sense. Two separate air jets are preferably used for this purpose. The air jets may be actuated in known manner via magnetic valves connected to an electrical circuit. One of the magnetic valves is switched on from the inspection or test station with the aid of control cams or the like.

The construction and operation of a machine embodying the invention will now be described more in detail with references to the accompanying drawings, in which.

Figure 3:
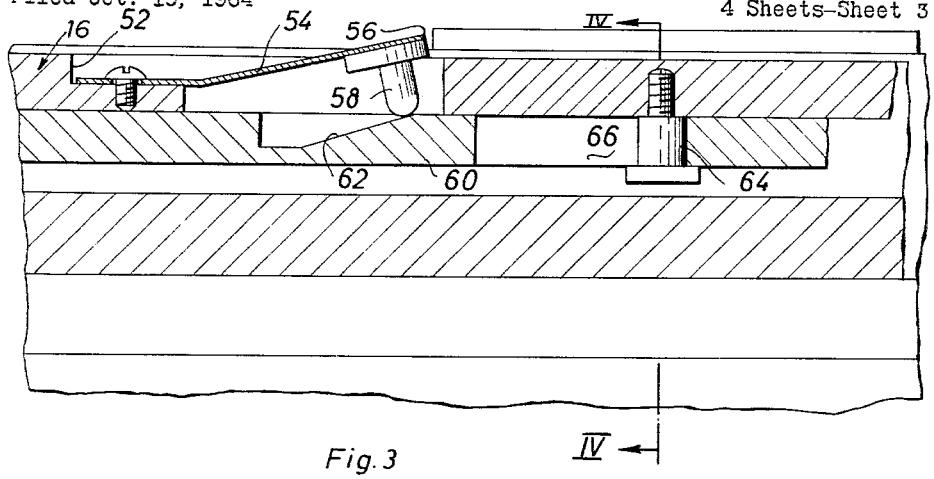
FIGURE 3 is an enlarged sectional view showing more in detail one of the pusher elements associated with the reciprocating slide for advancing the rings.
Figure 5:
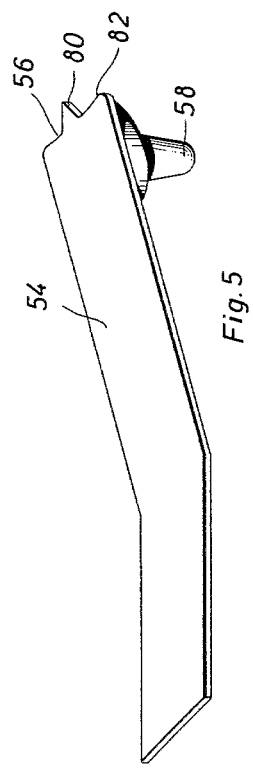
Figure 6:
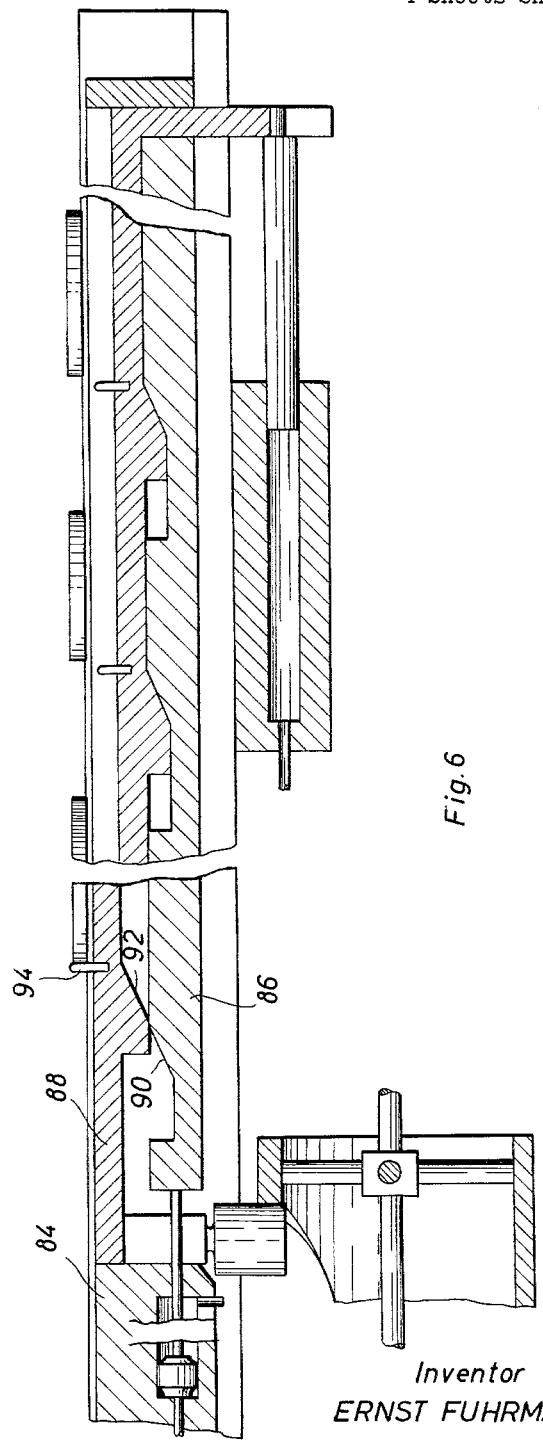

FIGURE 5 is a perspective view showing one form which the pusher element might take in order to keep the ring aligned in a certain oriented position as it passes through the machine, and FIGURE 6 is a sectional view similar to that of FIGURE 3 showing a modified arrangement of the pusher elements and with the pusher element in the left side of the view shown in ring engagement position preparatory advancing movement of the slide and with the pusher at the right side of the view shown in retracted position prior to retracting movement of the slide.

Figure 1:
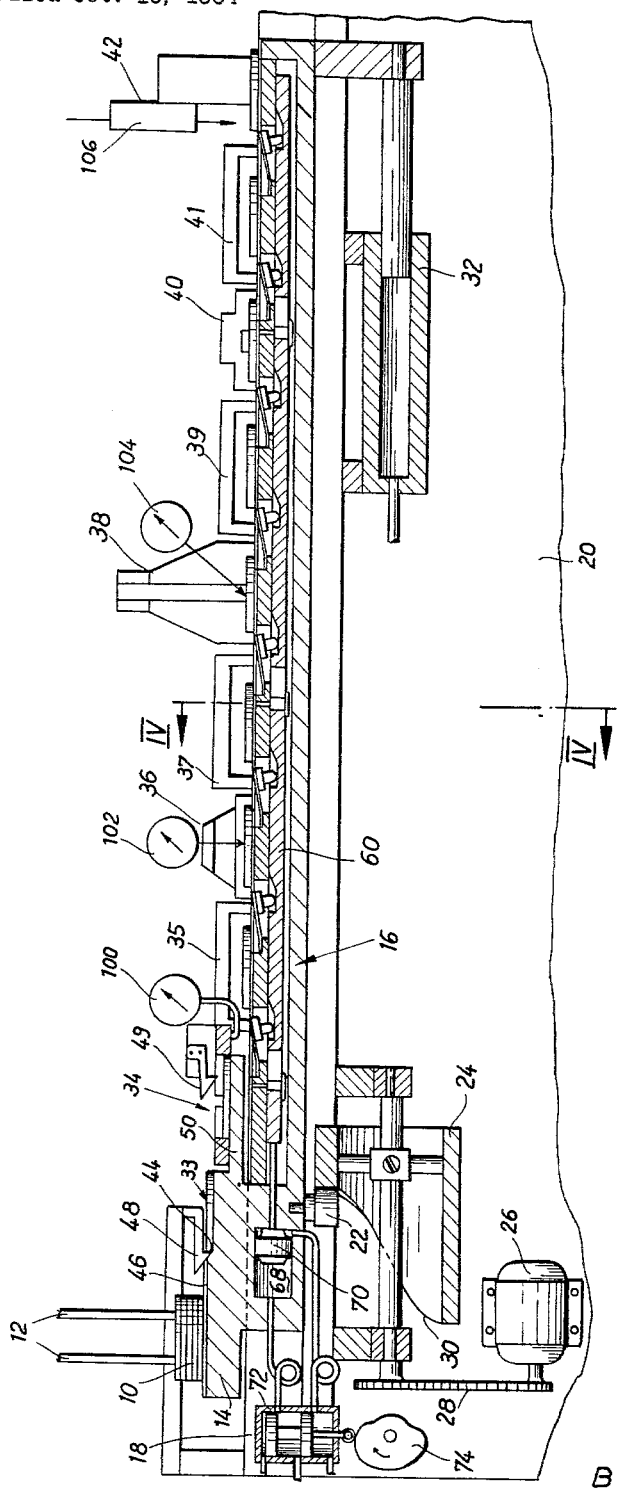
FIGURE 1 is a vertical sectional view through the machine as indicated by line I—I on FIGURE 2.
Figure 2:
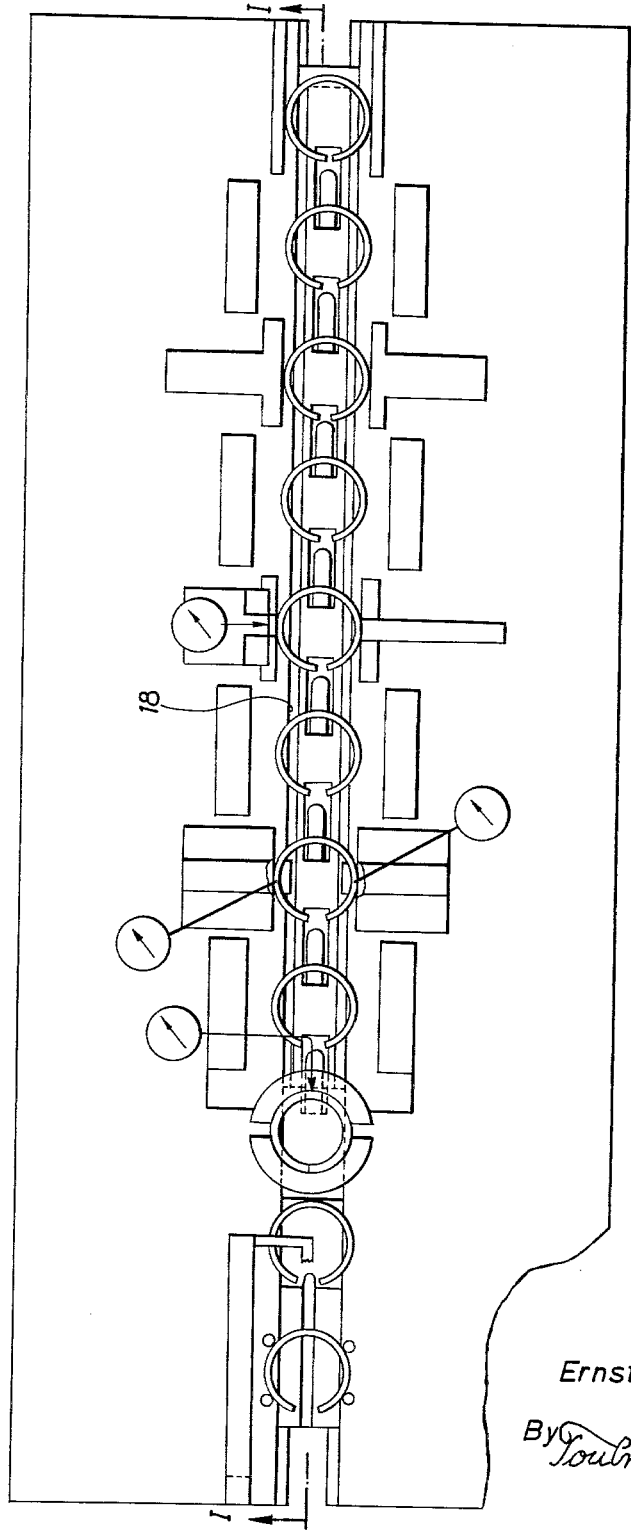
FIGURE 2 is a plan view of the machine.

Referring to FIGURE 1, rings 10 are arranged in stacked relation as, for example, in a cage 12 made up of vertical stationarily supported rods.

The rings rest on a table 14 which is a part of the reciprocating slide. The reciprocating slide, generally indicated by reference numeral 16, is slidably supported in a guideway 18 formed in the frame 20 of the machine and which may comprise a substantial working area, if so desired.

The slide is reciprocable in the frame by virtue of a roller 22 carried by the slide engaged by a rotary cam 24 carried by the frame of the machine and driven in rotation by a motor 26 which is connected to the supporting shaft for the cam by belt or pin drive arrangement 28.

The slide is continuously urged in a direction to hold roller 22 against the contoured face 30 of cam 24 by piston and cylinder means 32 connected between the frame of the machine and the slide and pressurized, for example, by compressed air.

The stroke of the slide, as imparted thereto by cam 24, is equal to the movement of the rings 10 from the supply magazine to the first intermediate station 33 and from this station to the first working station 34, and thereafter in succession to the intermediate stations 35, 37, 39, 41 and the intervening working stations 36, 38, and 40 and the final working station 42. Following the final working station 42 is a receiving station (not shown) that receives the fully inspected marked acceptable rings. At each of the intermediate stations following station 33, discharge means (not shown) are provided for expelling the rings which do not fall within the tolerance limits.

It will be noted that the slide 16 is below the level of the frame 20 of the machine so that the rings normally are supported at their side portions on the machine and are only abutted and moved longitudinally along the machine frame by the slide.

With respect to the transferring of the rings from station to station, when slide 16 retracts to its left hand limit, a ring from the magazine will drop in front of a shoulder 44 provided on table 14 so that when the slide then moves rightwardly in advancing direction, the ring removed from the magazine will be delivered to intermediate station 33. The table 14 is provided on the top with groove 46 which may be relatively short and which is adapted for receiving the hook end 48 of a stationary feed member. After the ring has reached intermediate station 33, upon the next retracting movement of slide 16 hook 48 will engage and hold the ring so that it will drop into the first inspection station 34 wherein the ring is inspected following the next advancing movement of the slide.

On the next retracting movement of the slide, the extension 50 of table 14 which forms a bottom for inspection station 34, will be withdrawn from beneath the station and the ring will drop down to the level of the other inspection station where it will remain until it is completely inspected. A suitable resilient hook 49 will hold the ring so that it will drop below when the table is withdrawn.

Movement of the ring from beneath inspection station 34 to the following intermediate station 35 and, to all of the other following stations is accomplished by pusher means carried by the slide and movable into follower ring engaging positions at the end of the retracting movement of the slide and into lower idle positions where they are beneath the level of the rings following the advancing movement of the slide.

There is a pusher element for each station along the machine, and the nature of the pusher elements will best be seen upon reference to FIGURES 1, 2, 3 and 5. The slide 16 is provided with an opening 52 for each station and disposed in each opening is a leaf spring 54 having a piston ring engaging forward end 56 and a depending actuating pin 58. The spring normally biases the pusher element downwardly to below the upper level of slide 16. An auxiliary slide element 60 is provided reciprocating on slide 16 and having a cam surface 62 for acting upon the adjacent actuating pin 58. Auxiliary slide element 60 is suspended from the upper portion of slide 16 by shoulder screw means 64, while slot means 66 and auxiliary slide means 60 provide for the necessary amount of reciprocatory movement thereof.

The slide has a cylinder 68 formed therein (FIGURE 1), and disposed in the cylinder is a piston 70 connected to auxiliary slide element 60. A valve 72 provides for the reversible supply of pressure fluid, such as compressed air, alternately to opposite ends of cylinder 68 in timed relation to the reciprocating movement of slide 16 so that auxiliary slide element 60 will move at the proper time to raise and lower the pusher elements. In FIGURE 1 the pusher elements are shown in retracted position with auxiliary slide element 60, whereas in FIGURE 3 the auxiliary slide is shown in its left hand position on slide 16 and the pusher elements are in their uppermost positions.

The timing of the movement of valve 72 is accomplished by a cam 74 mounted on the shaft which supports cam 24.

Figure 4:
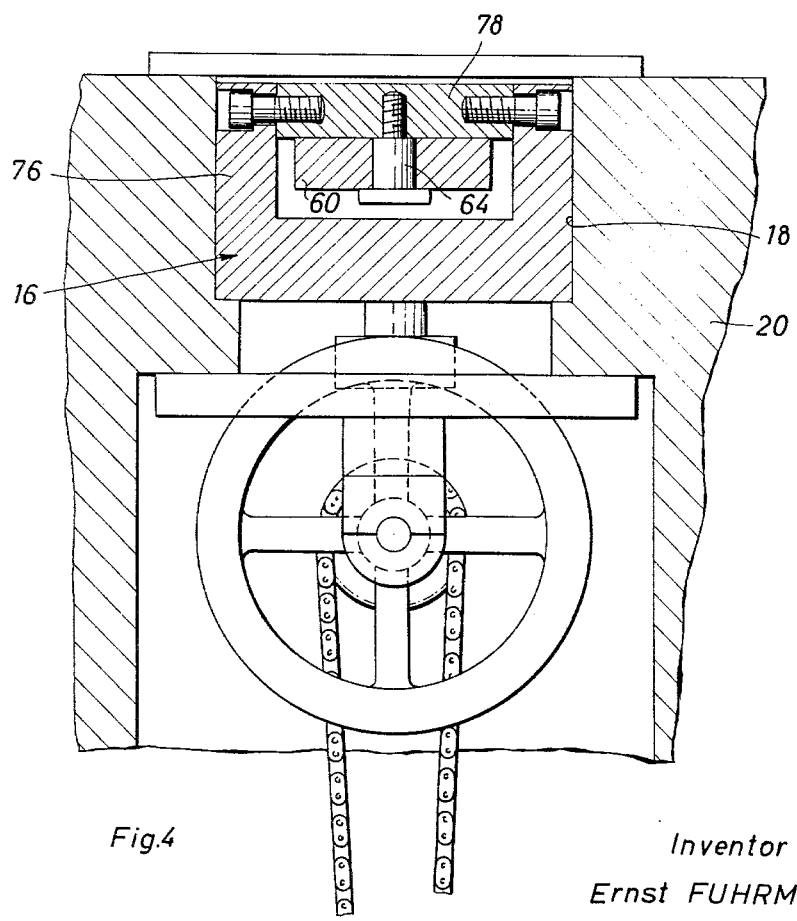
FIGURE 4 is a cross sectional view indicated by line IV—IV on FIGURES 1 and 3 showing more in detail the arrangement of the slide in the machine.

As can be seen in FIGURE 4, slide 16 may advantageously comprise a U-shaped base portion 76 slidably supported in the aforementioned guideway 18 of the frame of the machine and having its upper side closed by a plate 78 that carries auxiliary slide element 60 and which also is the member in which the apertures 52 are formed in which the pusher elements are located.

As will be seen in FIGURE 5, each pusher element may have its leading end 56 formed with a tongue 80 or the like and lateral abutment surfaces 82 so that when the ring is engaged by tongue 82, the ring is thereby held in properly oriented position while being advanced by the pusher element.

FIGURE 6 shows a modified arrangement wherein the main slide is indicated at 84 and the auxiliary slide means is indicated at 86. Instead of individual pusher elements at each pushing position, however, there is provided in slide 84 a member 88 that is vertically movable therein by virtue of the cooperating cam surfaces 90 of auxiliary slide element 86 and 92 on member 88. Member 88 thus moves in the vertical direction in slide 84 by reciprocation of auxiliary slide element 86 to carry the pusher elements into and out of pushing position. In FIGURE 6, on the left side, the auxiliary slide element is shown in position to lift member 88 into pushing position, whereas at the right side of FIGURE 6, auxiliary slide element 86 is shown in position to lower the member 88 into its retracted position.

In both of the described modifications, there is a main slide positioned in the guideway of the machine frame and below the top level thereof and carried by the main slide is an auxiliary slide element operable for actuating pusher means carried by the main slide between effective and ineffective positions.

With regard to the various measuring stations, station 34 carries a pair of half rings, one of which is movable toward and away from the other. In checking a piston ring, the shells are moved toward each other until the gap of the piston ring is closed and an instrument 100 associated with the movable half ring will indicate whether or not the piston ring is within tolerance limits. This instrument can actuate a discharging mechanism if the piston ring is outside tolerance limits, which will bring about discharging thereof at station 35.

At station 36, the axial height of the ring is measured and an instrument 102 is provided not only for indicating when the ring falls within tolerance limits, but also for controlling the following discharging station 37 when the ring falls outside the tolerance limits.

At station 38 the tangential stress of the ring is measured and this may be done by introducing the ring between a leaf spring and a slide and moving the slide until the gap of the ring is approximately closed. The load on the leaf spring is indicated on instrument 104 and shows the tangential stress of the ring. As before, this instrument is in control of the subsequent discharging station 39.

Another measuring station at 40 is provided to determine if the ring is properly positioned when the ring has a running surface differing from cylindrical. This station is in control of the final discharging station 41. This station may comprise spaced stops so that if the ring is in the correct position with its larger diameter downward, only the lower stop will be contacted; whereas if the ring is in inverted position with its larger diameter upward, the larger stop will be contacted. This will effect the control of the discharging station 41.

The final station 42 includes stamping means 106 for marking the top of the ring so that when the ring is assembled with a piston it can be placed thereon in the proper position.

The discharge stations previously referred to can furthermore be selective if so desired. If a ring, for example, is undersized, it is probably scrap, whereas if the ring is oversized then the possibility presents itself of re-operating the ring to bring it within the tolerance limits. Other defects will suggest themselves, some of which are correctable and some of which are not. The discharge stations can thus be caused to discharge scrap in one direction and re-operable rings in the other direction. Selective sorting of the rings as to diameter could also be effected in this manner so that rings oversize to a desired degree could be sorted out at the time of passing through the machine according to the present invention.

It will be understood that this invention is susceptible to modification in order to adapt it to different usages and conditions; and accordingly, it is desired to comprehend such modifications within this invention as may fall within the scope of the appended claims.

What is claimed is:

1. A conveyor apparatus for automatically moving split piston rings over a plurality of inspection stations which are serially arranged over the length of said apparatus comprising: support means, a common magazine from which said rings are sequentially passed through to said stations, and reciprocating slide means having means for withdrawing rings from said magazine and also having pusher means operatively connected therewith for intermittently engaging and moving said rings successively from station to station, said slide means comprising a main slide means having said pusher means thereon which are movable from an inoperative position wherein they do not engage the rings, to an operative position wherein they do engage and move said rings, and an auxiliary slide means having caming surfaces thereon in operative engagement with said pusher means for moving said pusher means into said operative positions upon the forward movement of said main slide means and for moving said pusher elements into said inoperative position upon the rearward movement of said main slide means.

2. The apparatus as claimed in claim 1 in which said auxiliary slide means is carried by said main slide means.

3. The apparatus as claimed in claim 2 in which said reciprocating slide means further comprises, first drive means mounted in said support means for reciprocating said main slide means, and second drive means mounted in said first slide means for reciprocating said auxiliary slide means in timed relation to said main slide means.

4. A conveyor apparatus for automatically moving split piston rings over a plurality of inspection stations which are serially arranged over the length of said apparatus comprising: support means, a common magazine on said support means through which said rings are sequentially passed to said stations, reciprocating slide means independent of said stations operable for withdrawing rings from said magazine and for passing them sequentially to said stations, said reciprocating slide means comprising: main slide means mounted in said support means for reciprocal movement therein, first drive means mounted on said support means to reciprocate said main slide means, pusher means carried by said main slide means having an ineffective position wherein they do not engage the rings and an effective position from which said pusher means are adapted for engaging and moving said rings successively from station to station upon the forward movement of said main slide means, auxiliary slide means carried by said main slide means and reciprocally mounted thereon, second drive means mounted on said first slide means to reciprocate said auxiliary slide means in timed relation with said first drive means, said auxiliary slide means having caming surfaces thereon in operative engagement with said pusher means for moving said pusher means into said operative position, and means to maintain said main slide means in operative engagement with said first drive means.

5. The apparatus as claimed in claim 4 in which said slide means has a plurality of spaced holes along the top side of the length thereof in which said pusher means are located, said pusher means each having a tongue element for pushing said split rings, a leaf spring having one end secured in opening and said tongue element secured to said other end to bias said tongue elements toward said caming surfaces on said auxiliary slide means.

6. The apparatus as claimed in claim 4 in which said pusher means comprises an elongated member having pusher elements equally spaced thereon, said elongated member also having caming surfaces thereon in cooperative engagement with the said caming surfaces on said auxiliary slide means to raise said elongated member into said operative position.

7. The apparatus as claimed in claim 4 further comprising a plurality of inspection stations which are serially arranged over the length of said conveyor apparatus, said stations having means for engaging the rings therein and operable for carrying out the following operation, (a) gap measurement; (b) measurement of axial thickness; (c) tangential force measurement; (d) testing for correct axial position of the rings; (e) stamping rings to mark the correct top side thereof.

8. A conveyor apparatus for automatically moving split piston rings over a plurality of inspection stations which are serially arranged over the length of said apparatus comprising; support means, a common magazine on said support means through which said rings are sequentially passed to said stations, reciprocating slide means operable for withdrawing rings from said magazine and for passing them sequentially to said stations comprising: main slide means mounted in said support means for reciprocal movement therein having an intermediate station with a shoulder thereon for withdrawing rings from said magazine, said main slide means also having an extension table positioned adjacent to said intermediate station adapted to receive rings from said intermediate station, means for engaging said rings to transfer them from said intermediate station to said table upon the rearward reciprocation of said main slide means, said main slide means also having a plurality of equally spaced pusher elements thereon which are movable from an inoperative position wherein they do not engage the rings to an operative position wherein they do engage and move the rings successively from station to station, means for transferring said rings from said table to the first pusher element of said plurality upon the rearward reciprocation of said main slide means, said main slide means having a top side which is below the level of the top of said support means so that said rings are normally supported on said support means as they are pushed to said plurality of inspection stations by said pusher elements, auxiliary slide means carried by said main slide means and having caming surfaces in operative engagement with said pusher elements for moving said pusher elements into said operative and inoperative positions, first drive means mounted in said support means for reciprocating said main slide means, second drive means mounted in said first slide means for reciprocating said auxiliary slide means in timed relation to said main slide means.

9. The apparatus as claimed in claim 8 in which said main slide means has a plurality of spaced holes along the top side thereof in which said pusher elements are located, each said pusher element having a tongue for pushing said split rings, a leaf spring having one end secured in said opening and said tongue secured to the other end to bias said tongue toward the pertaining caming surface on said auxiliary slide means.

10. A conveyor apparatus for automatically moving split piston rings over a plurality of inspection stations which are serially arranged over the length of said apparatus comprising; support means, a common magazine on said support means through which said rings are sequentially passed to said stations, reciprocating slide means operable for withdrawing rings from said magazine and for passing them sequentially to said stations comprising, main slide means mounted in said support means for reciprocal movement therein having an intermediate station with a shoulder thereon for withdrawing rings from said magazine, said main slide means also having an extension table positioned adjacent to said intermediate station adapted to receive rings from said intermediate station, means for engaging said rings to transfer them from said intermediate station to said table upon the rearward reciprocation of said main slide means, said main slide means having a vertically movable member having caming surfaces on the underside and a plurality of equally spaced pusher elements extending vertically from the top side thereof, said vertically movable member with said pusher elements thereon being movable from an inoperative position wherein the pusher elements do not engage the rings to an operative position wherein they do engage and move the rings successively from station to station, means for transferring said rings from said table to the first pusher element of said plurality upon the rearward reciprocation of said main slide means, said main slide means having a top side which is below the level of the top of said support means so that said rings are normally supported on said support means as they are pushed to said plurality of inspection stations by said pusher elements, auxiliary slide means carried by said main slide means and having caming surfaces in operative engagement with the said caming surfaces on said vertically movable member for moving said pusher elements into said operative and inoperative positions, first drive means mounted in said support means for reciprocating said main slide means, second drive means mounted in said first slide means for reciprocating said auxiliary slide means in timed relation to said main slide means.

References Cited by the Examiner

UNITED STATES PATENTS 2,580,342  12/1951  Aller _____ 209—75

FOREIGN PATENTS 1,069,525  11/1959  Germany.

SAMUEL F. COLEMAN, *Primary Examiner.*

RICHARD E. AEGERTER, *Examiner.*